(12) United States Patent
Niwa et al.

(10) Patent No.: US 9,469,299 B2
(45) Date of Patent: Oct. 18, 2016

(54) DECELERATION SETTING SYSTEM, DECELERATION SETTING METHOD, AND DECELERATION SETTING PROGRAM

(71) Applicants: AISIN AW CO., LTD., Anjo-shi, Aichi (JP); TOYOTA JIDOSHA KABUSHIKI KAISHA, Toyota-shi, Aichi-ken (JP)

(72) Inventors: Toshiaki Niwa, Anjo (JP); Tomoki Kodan, Toyota (JP); Kuniaki Tanaka, Toyota (JP)

(73) Assignees: AISIN AW CO., LTD., Anjo (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 267 days.

(21) Appl. No.: 14/466,212

(22) Filed: Aug. 22, 2014

(65) Prior Publication Data
US 2015/0057905 A1 Feb. 26, 2015

(30) Foreign Application Priority Data
Aug. 22, 2013 (JP) .................... 2013-171863

(51) Int. Cl.
*B60W 30/14* (2006.01)
*B60W 30/18* (2012.01)
*G08G 1/0967* (2006.01)

(52) U.S. Cl.
CPC ...... *B60W 30/143* (2013.01); *B60W 30/18109* (2013.01); *G08G 1/096725* (2013.01); *B60W 2550/22* (2013.01); *B60W 2550/402* (2013.01); *B60W 2720/106* (2013.01)

(58) Field of Classification Search
CPC .............. B60W 30/143; B60W 30/18109; B60W 2550/402; B60W 2550/22; B60W 2720/106; G08G 1/096725
See application file for complete search history.

(56) References Cited

U.S. PATENT DOCUMENTS

| 5,521,579 | A  | * | 5/1996 | Bernhard | ........... B60K 31/0008 180/167 |
| 9,373,149 | B2 | * | 6/2016 | Abhyanker | ............ G06Q 50/28 |
| 9,381,917 | B1 | * | 7/2016 | Dolgov | .............. B60W 30/143 |
| 2010/0152963 | A1 | * | 6/2010 | Heckel | .................. B60W 30/17 701/29.2 |

(Continued)

FOREIGN PATENT DOCUMENTS

| JP | 2011-129139 A | 6/2011 |
| JP | 2011-154619 A | 8/2011 |

(Continued)

*Primary Examiner* — Mussa A Shaawat
(74) *Attorney, Agent, or Firm* — Oliff PLC (57) ABSTRACT

Deceleration control systems, methods, and programs acquire from learning information a target deceleration point in front of a traveling vehicle and an associated deceleration end point. The deceleration end point is a point representative of one or more locations at which deceleration of the vehicle or another vehicle was actually completed in the past as the vehicle or the other vehicle approached the associated deceleration end point. The systems, methods, and programs determine a distance between the acquired target deceleration point and the acquired deceleration end point as a predicted distance over which traffic is present. The systems, methods, and programs communicate with a vehicle ECU to perform a deceleration control of the vehicle so that (i) the longer the determined distance, the greater the deceleration rate applied during the deceleration control, and (ii) the deceleration is complete by the time the vehicle reaches the acquired deceleration end point.

20 Claims, 3 Drawing Sheets

(56) References Cited

U.S. PATENT DOCUMENTS

| | | | |
|---|---|---|---|
| 2013/0345944 A1* | 12/2013 | Kasiraj | B60W 30/16 701/96 |
| 2014/0114548 A1* | 4/2014 | Kagerer | B60W 50/0097 701/96 |
| 2014/0309903 A1 | 10/2014 | Otake | |
| 2014/0330479 A1* | 11/2014 | Dolgov | B60W 30/16 701/28 |

FOREIGN PATENT DOCUMENTS

| | | |
|---|---|---|
| JP | A 2011-227833 | 11/2011 |
| WO | 2013/072995 A1 | 5/2013 |

* cited by examiner

DECELERATION SETTING SYSTEM, DECELERATION SETTING METHOD, AND DECELERATION SETTING PROGRAM

INCORPORATION BY REFERENCE

The disclosure of Japanese Patent Application No. 2013-171863, filed on Aug. 22, 2013, including the specification, drawings and abstract, is incorporated herein by reference in its entirety.

BACKGROUND

1. Related Technical Fields

Related technical fields include deceleration setting systems, deceleration setting methods, and deceleration setting programs that set a deceleration so as to perform a deceleration control at a deceleration point.

2. Related Art

A driving support apparatus is known which sets a timing of deceleration guidance at each intersection at which deceleration assist is carried out (see Japanese Patent Application Publication No. 2011-227833 (JP 2011-227833 A)). That is, a driving support apparatus is known which provides deceleration guidance earlier or later depending on intersections.

SUMMARY

When the deceleration guidance, however, is provided early, the deceleration is started at a position distant from an intersection and thus there is a problem of a traffic flow being disturbed when a traffic volume is large.

The broad principles described herein were invented in consideration of the above-mentioned problem and exemplary implementations of these broad inventive principles provide a technique capable of performing a deceleration control so that a traffic flow is not disturbed.

Exemplary implementations provide deceleration control systems, methods, and programs for a vehicle that access learning information, the learning information including target deceleration points associated with deceleration end points, each target deceleration point being a point on a road where deceleration of the vehicle must be completed, and each deceleration end point being a point representative of one or more locations at which deceleration of the vehicle or another vehicle was actually completed in the past as the vehicle or the other vehicle approached the associated deceleration end point. While the vehicle is traveling, the systems, methods, and programs acquire from the learning information a target deceleration point in the direction of travel of the vehicle and the deceleration end point associated with the acquired target deceleration point. The systems, methods, and programs determine a distance between the acquired target deceleration point and the acquired deceleration end point, and predict that the determined distance is a distance over which traffic is present prior to the target deceleration point in the direction of travel of the vehicle. The systems, methods, and programs communicate with a vehicle ECU to perform a deceleration control of the vehicle so that (i) the longer the determined distance, the greater the deceleration rate applied during the deceleration control, and (ii) the deceleration is complete by the time the vehicle reaches the acquired deceleration end point.

According to these implementations, since the deceleration is set before the target deceleration point depending on the predicted traffic volume, it is possible to set the deceleration so as not to disturb a traffic flow.

DETAILED DESCRIPTION OF EXEMPLARY IMPLEMENTATIONS

Hereinafter, examples will be described in the following order: (1) Configuration of Navigation System; (2) Deceleration Control Process; and (3) Other Examples.

1. Configuration of Navigation System

Figure 1:
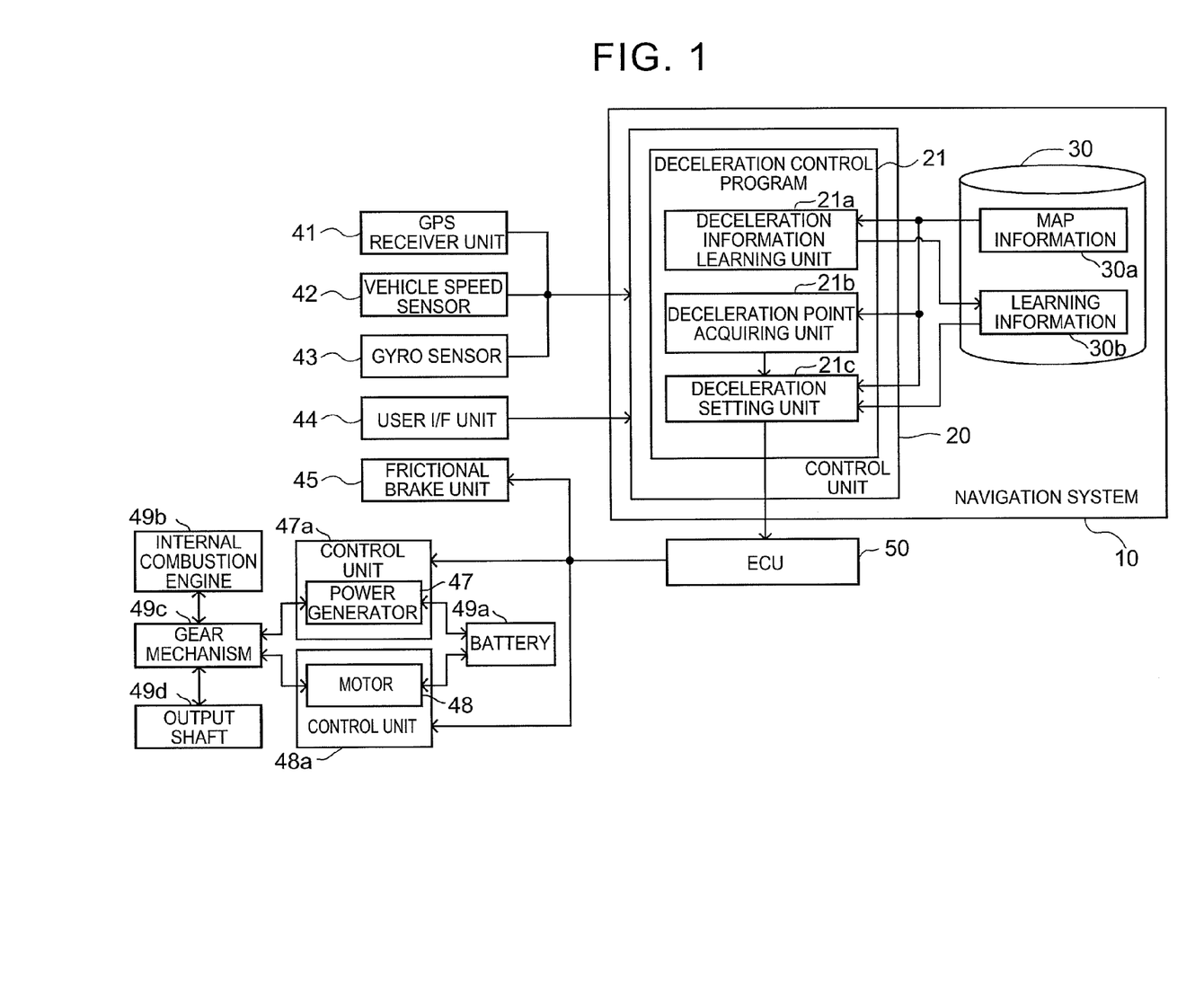
FIG. 1 is a block diagram illustrating a navigation system including a deceleration setting system.

FIG. 1 is a block diagram illustrating a configuration of a deceleration setting system mounted on a vehicle. In this example, the deceleration setting system is embodied by a navigation system 10. The navigation system 10 includes a control unit 20 including a CPU, a RAM, and a ROM, and the control unit 20 executes programs stored in the ROM. In this example, a navigation program can be executed as one of the programs. The navigation program is a program causing the control unit 20 to perform a function of guiding a driver to a destination by displaying a map including a current position of a vehicle. The navigation program includes various programs used in the course of traveling of the vehicle. In this example, the navigation program includes a deceleration control program 21 causing the control unit 20 to perform a deceleration control of applying a braking force to the vehicle in a section in which the vehicle decelerated in the past.

Map information 30a is recorded on a recording medium 30. Learning information 30b is recorded on the recording medium 30 in the course of traveling of the vehicle. The map information 30a includes node data indicating positions of nodes corresponding to end points (start points and end points) of a road section in which a vehicle travels, shape interpolation point data indicating positions of shape interpolation points for specifying a shape of a road between the nodes, and link data indicating a link between the nodes. The map information 30a further includes terrestrial object data indicating a road and features disposed around the road.

The RAM, ROM, and recording medium are all computer-readable storage mediums. The term "computer-readable storage medium" as used herein is not intended to encompass transitory signals.

The learning information 30b is information indicating a target deceleration point at which a deceleration control process will be performed. In the learning information 30b in this example, at least a deceleration end point and a target vehicle speed are recorded in association with each target deceleration point.

The target deceleration point is a deceleration point, which is present in the same link as the deceleration end point and which is closest to the deceleration end point and ahead of the deceleration end point (ahead in the traveling direction of the vehicle), out of the deceleration points. The deceleration point is a point at which a feature as a factor of deceleration of a vehicle is present in the map information 30a and is a point that can be specified in advance on the basis of the feature data, the link data, or the like of the map information 30a. In this example, a point at which any of a temporary stop line, a traffic light, and a crossing is located is a deceleration point.

The deceleration end point is a point at which the deceleration of a vehicle was ended in the past, and which is before the target deceleration point (behind in the traveling direction of the vehicle). That is, a driver decelerates the vehicle with the target deceleration point as a target, and the deceleration is thus ended at the deceleration end point. In this example, the deceleration end point is a point at which the vehicle speed reaches 0 subsequently to a decrease in vehicle speed by a predetermined degree of decrease or more (for example, 5 km/h) and a point at which the vehicle speed increases again subsequently to a decrease in vehicle speed by a predetermined degree of decrease or more. The deceleration end point in this example is a point at which the number of times of deceleration N at the same position is equal to or more than a threshold value (for example, five) and a deceleration probability obtained by dividing the number of times of deceleration N by a total number of times of passing is equal to or greater than a predetermined probability (for example, 80%). The total number of times of passing is the number of times at which the vehicle passed through the deceleration end point regardless of whether the vehicle decelerated or not. The increase in vehicle speed again means that the state of an accelerator pedal not illustrated is changed from a released state to a pressed state.

In this example, deceleration end points which are not strictly the same position but are present within an acceptable error are considered as deceleration end points of the same position. Accordingly, the number of times of deceleration N at the same position means the number of deceleration end points that are present within an acceptable error. For example, in the same link as the target deceleration point, N deceleration end points at which a distance between the farthest deceleration end point (close to the target deceleration point) and the closest deceleration end point (farthest from the target deceleration point) is within an acceptable error (20 m) are considered as the deceleration end points of the same position. A point representative of the N deceleration end points present within an acceptable error is learned as a valid deceleration end point in the learning information 30b. The valid deceleration end point means a deceleration end point that is a subject of a deceleration control to be described later.

Figure 2A:
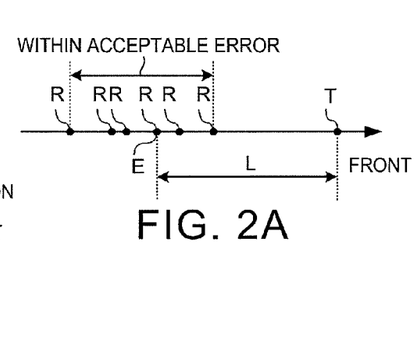
FIG. 2A is a diagram illustrating a deceleration end point.

The point representative of the N deceleration end points present within the acceptable error is a center point out of the N deceleration end points. FIG. 2A is a diagram schematically illustrating deceleration end points R. As illustrated in the drawing, the point (valid deceleration end point E) representative of the N deceleration end points R present within the acceptable error is a deceleration end point E located at the N/2-th (rounding-up to the nearest whole number) position from the target deceleration point T located ahead. When the deceleration end point E is learned as valid but the deceleration probability is less than a predetermined probability, the deceleration end point E is invalidated in the learning information 30b. The target vehicle speed is an average vehicle speed of vehicle speeds when the deceleration is ended at the respective N deceleration end points R of the same position. The target vehicle speed may be a minimum vehicle speed among the vehicle speeds when the deceleration is ended at the respective N deceleration end points R of the same position or may be a legal vehicle speed required by the law at the target deceleration point T located ahead of the deceleration end points R.

A vehicle in this example includes a GPS receiver unit 41, a vehicle speed sensor 42, a gyro sensor 43, a user I/F unit 44, a frictional brake unit 45, an internal combustion engine 49b, a gear mechanism 49c, an output shaft 49d, a power generator 47, a motor 48, a battery 49a, and an ECU 50. The vehicle is a hybrid vehicle that is driven by transmitting the rotational drive force of the internal combustion engine 49b and the motor 48 to the output shaft 49d via the gear mechanism 49c. Accordingly, the vehicle may be braked by an engine brake that transmits the rotational drive force of the output shaft 49d to the internal combustion engine 49b via the gear mechanism 49c or a regenerative brake that transmits the rotational drive force of the output shaft 49d to the power generator 47 via the gear mechanism 49c and accumulates electric power to the battery 49a. The energy distribution to the internal combustion engine 49b, the power generator 47, and the motor 48 can be adjusted on the basis of a control signal generated by the ECU 50.

The frictional brake unit 45 includes a device that controls the pressure of a wheel cylinder for adjusting a degree of deceleration by a frictional brake mounted on each vehicle wheel, and the control unit 20 can output a control signal to the frictional brake unit 45 to adjust the pressures of the wheel cylinders. Accordingly, when the control unit 20 outputs a control signal to the frictional brake unit 45 to increase the pressures of the wheel cylinders, the braking force from the frictional brake increases and the vehicle is decelerated. The ECU 50 outputs a control signal for performing a braking operation by combination of the regenerative brake, the engine brake, and the frictional brake to the power generator 47, the gear mechanism 49c, and the frictional brake unit 45. The ECU 50 outputs the control signal to the power generator 47, the gear mechanism 49c, and the frictional brake unit 45 so as to realize a deceleration set by the navigation system 10.

The upper limit (hereinafter, referred to as regenerative upper-limit power) of power (power=current·voltage) that can be accumulated in the battery 49a by the regenerative brake is determined. When a deceleration corresponding to power greater than the regenerative upper-limit power is set by the navigation system 10, the ECU 50 allocates the regenerative upper-limit power out of the power corresponding to the set deceleration to the regenerative brake and allocates the remaining power to the engine brake and the frictional brake. That is, the ECU 50 outputs a control signal for generating a regenerative braking force corresponding to the regenerative upper-limit power out of the braking force corresponding to the deceleration set by the navigation system 10 to the gear mechanism 49c and the power generator 47, and outputs a control signal for generating an engine braking force and a frictional braking force corresponding to the remaining power to the gear mechanism 49c and the frictional brake unit 45. Therefore, when the deceleration set by the navigation system 10 is greater than a predetermined value, a brake other than the regenerative brake generates a braking force and thus regeneration efficiency at which the kinetic energy of the vehicle can be recovered as electric energy is lowered. The vehicle is provided with a brake pedal not illustrated. When the brake pedal is stepped, the ECU 50 outputs a control signal for generating a braking force corresponding to a deceleration based on the degree of stepping on the brake pedal instead of the deceleration set by the navigation system 10 to the power generator 47, the gear mechanism 49c, and the frictional brake unit 45.

The GPS receiver unit 41 receives RF waves from GPS satellites and outputs a signal for calculating a current position of the vehicle via an interface not illustrated. The control unit 20 acquires this signal and acquires the current position of the vehicle. The vehicle speed sensor 42 outputs a signal corresponding to the rotation speed of the vehicle wheels of the vehicle. The control unit 20 acquires this signal via an interface not illustrated and acquires the vehicle speed. The gyro sensor 43 detects an angular acceleration of a turn of the vehicle in the horizontal plane and outputs a signal corresponding to the orientation of the vehicle. The control unit 20 acquires this signal and acquires the traveling direction of the vehicle. The vehicle speed sensor 42, the gyro sensor 43, and the like are used to specify a traveling path of the vehicle. In this example, the current position is specified on the basis of the start point and the traveling path of the vehicle, and the current position of the vehicle specified on the basis of the start point and the traveling path is corrected on the basis of the output signal of the GPS receiver unit 41.

The user I/F unit 44 is an interface unit that receives a driver's instruction and that provides a variety of information to the driver, and includes an input unit such as a display unit including a touch panel display not illustrated or a switch and a sound output unit such as a speaker. The user I/F unit 44 receives a control signal from the control unit 20 and displays an image for providing a variety of guidance on the touch panel display.

A deceleration control program 21 includes a deceleration information learning unit 21a, a deceleration point acquiring unit 21b, and a deceleration setting unit 21c.

The deceleration information learning unit 21a is a module that causes the control unit 20 to perform a function of learning the deceleration end point R and the target vehicle speed in association with the target deceleration point T in the learning information 30b. Through the use of the function of the deceleration information learning unit 21a, the control unit 20 learns a point at which the vehicle speed reaches 0 subsequently to a decrease in vehicle speed by a predetermined degree of decrease or more (for example, 5 km/h) and a point at which the vehicle speed increases again subsequently to a decrease in vehicle speed by a predetermined degree of decrease or more as the deceleration end points R in the learning information 30b.

As illustrated in FIG. 2A, when the number of times of deceleration N as the number of times of learning of the deceleration end points R at the same position (within the acceptable error) is equal to or greater than a threshold value (for example, five), the control unit 20 learns the point representative of the N deceleration end points R learned at the position as valid deceleration end point E in the learning information 30b through the use of the function of the deceleration information learning unit 21a. As illustrated in FIG. 2A, the control unit 20 specifies the deceleration end point R located at the N/2-th (rounding-up to a nearest whole number) position from the target deceleration point T located ahead as the point representative of the N deceleration end points R present within the acceptable error, and learns the specified point as the valid deceleration end point E. Here, when the valid deceleration end point E is learned but the deceleration probability is less than a predetermined probability (for example, 80%), the control unit 20 invalidates the deceleration end point E in the learning information 30b.

Through the use of the function of deceleration information learning unit 21a, the control unit 20 learns the average vehicle speed of vehicle speeds when the deceleration is ended at the respective N deceleration end points R of the same position as the target vehicle speed in the learning information 30b. Through the use of the function of deceleration information learning unit 21a, the control unit 20 specifies the deceleration point closest to the valid deceleration end point E out of the deceleration points present ahead of the valid deceleration end point E in the same link as the valid deceleration end point E as the target deceleration point T. Then, the control unit 20 learns the valid deceleration end point E and the target vehicle speed in association with the target deceleration point T in the learning information 30b. Hereinafter, when a deceleration end point E is described, it means a valid deceleration end point E unless otherwise mentioned.

The deceleration point acquiring unit 21b is a module that causes the control unit 20 to perform a function of acquiring a deceleration point on a map. Through the use of the function of the deceleration point acquiring unit 21b, the control unit 20 acquires a target deceleration point as a deceleration point from the learning information 30b. Specifically, when the vehicle approaches the deceleration end point E learned in the learning information 30b, the control unit 20 acquires the target deceleration point T learned in association with the deceleration end point E.

The deceleration setting unit 21c is a module that causes the control unit 20 to perform a function of setting a deceleration when the vehicle is subjected to a deceleration control before the target deceleration point T depending on a traffic volume at the target deceleration point T. As illustrated in FIG. 2A, the control unit 20 acquires a determination distance L, which is a distance from the deceleration end point E to the target deceleration point T, as the traffic volume through the use of the deceleration setting function. The determination distance L is defined as a straight distance between the deceleration end point E and the target deceleration point T. The determination distance L may be a distance on the link between the deceleration end point E and the target deceleration point T. An association between the determination distance L and an actual traffic volume (for example, an inter-vehicle distance or the number of vehicles passing per unit time) may be recorded in advance on the recording medium 30, and the control unit 20 may convert the determination distance L into the traffic volume such as the inter-vehicle distance or the number of vehicles passing on the basis of the association.

Figure 2B:
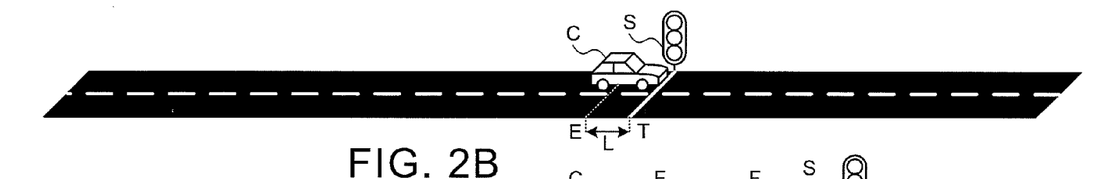
FIGS. 2B to 2D are diagrams schematically illustrating deceleration points.
Figure 2C:
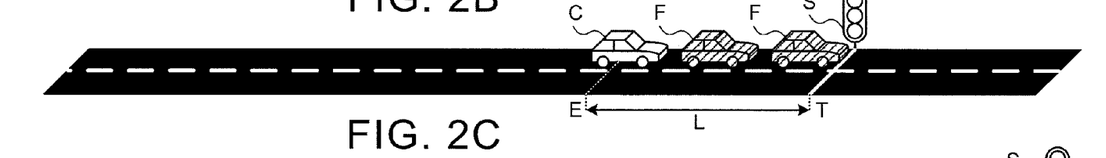
Figure 2D:
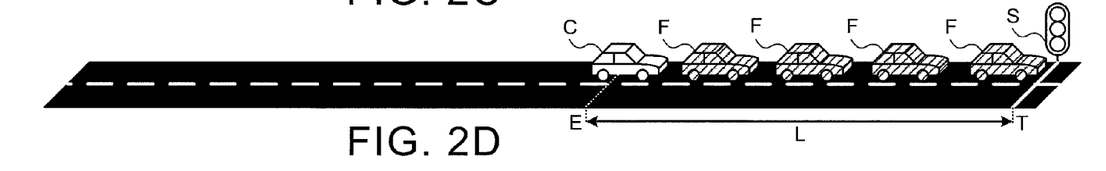
Figure 2E:
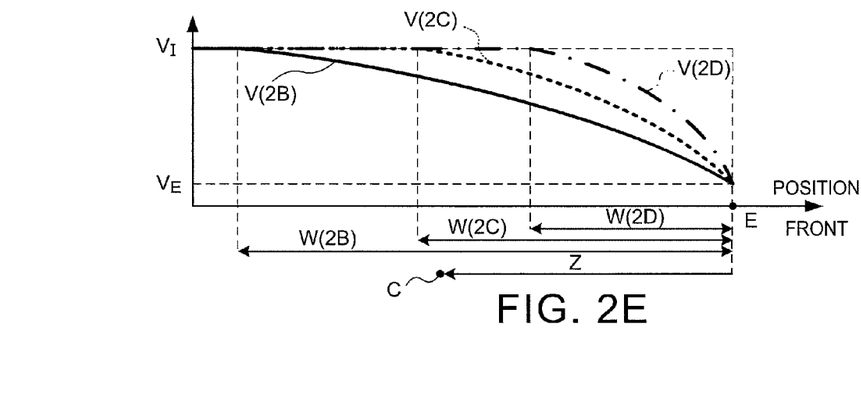
FIG. 2E is a graph illustrating a vehicle speed in a deceleration control.

Through the use of the function of the deceleration setting unit 21c, the control unit 20 sets the deceleration to increase as the determination distance L as the traffic volume increases. FIG. 2E is a graph illustrating the vehicle speeds in FIGS. 2B to 2D. The horizontal axis in FIG. 2E represents the position of a vehicle in the traveling direction and the vertical axis in FIG. 2E represents the vehicle speed. In FIGS. 2B to 2D, the point at which a traffic light S is disposed is a target deceleration point T and the point at which a vehicle C marked by whitening is located is a deceleration end point E. Other vehicles F marked by hatching mean vehicles F that may be present between the vehicle C of which the deceleration is ended at the deceleration end point E and the target deceleration point T. The determination distance L in FIG. 2C is greater than that in FIG. 2B, and the determination distance L in FIG. 2D is greater than that in FIG. 2C. In FIG. 2E, the solid line indicates a vehicle speed function V in FIG. 2B, the dotted line indicates a vehicle speed function V in FIG. 2C, and the one-dotted chain line indicates a vehicle speed function V in FIG. 2D.

In this example, through the use of the function of the deceleration setting unit 21c, the control unit 20 sets the deceleration on the basis of a reference deceleration function F(Z) in which a deceleration is defined for each remaining distance Z from the vehicle C to the deceleration end point E. The reference deceleration function F(Z) is a function of the remaining distance Z (for example, a straight distance) from the vehicle C to the deceleration end point E, and the vehicle speed function V indicated by the solid line in FIG. 2E corresponds to a primary integral function of the reference deceleration function F(Z). The reference deceleration function F(Z) is a function for defining a deceleration so that the power in deceleration is equal to the regenerative upper-limit power in the regenerative brake. Accordingly, when the deceleration is set on the basis of the reference deceleration function F(Z), the ECU 50 can recover the kinetic energy of the vehicle to the battery 49a without waste by outputting a control signal based on the set deceleration to the power generator 47, the gear mechanism 49c, and the frictional brake unit 45.

Through the use of the function of the deceleration setting unit 21c, the control unit 20 sets the deceleration on the basis of the reference deceleration function F(Z) when the determination distance L as the traffic volume falls into a first distance section (for example, 0 m≤L<5 m). When it is assumed in FIG. 2B that the determination distance L falls into the first distance section, the vehicle speed slowly decreases like the vehicle speed function V indicated by the solid line in FIG. 2E.

Through the use of the function of the deceleration setting unit 21c, the control unit 20 sets the deceleration on the basis of a reference deceleration function K1□F(Z), which is obtained by multiplying the reference deceleration function F(Z) by a predetermined coefficient K1 (>1) (for example, K1=1.5), when the determination distance L falls into a second distance section (for example, 5 m≤L<15 m) greater than the first distance section. When it is assumed in FIG. 2C that the determination distance L falls into the second distance section, the vehicle speed decreases more rapidly than the vehicle speed function V in FIG. 2B in which the determination distance L falls into the first distance section, like the vehicle speed function V indicated by the dotted line in FIG. 2E.

Through the use of the function of the deceleration setting unit 21c, the control unit 20 sets the deceleration on the basis of a reference deceleration function K2·F(Z), which is obtained by multiplying the reference deceleration function F(Z) by a predetermined coefficient K2 (K2>K1) (for example, K2=2), when the determination distance L falls into a third distance section (for example, 15 m≤L<25 m) greater than the second distance section. When it is assumed in FIG. 2D that the determination distance L falls into the third distance section, the vehicle speed decreases more rapidly than the vehicle speed function V in FIG. 2C in which the determination distance L falls into the second distance section, like the vehicle speed function V indicated by the one-dotted chain line in FIG. 2E. Accordingly, the control unit 20 can set the deceleration to be greater as the determination distance L as the traffic volume increases. The coefficients K1 and K2 may not be set to constant values for each section of the determination distance L and may be derived using a monotonous increasing function of the determination distance L.

Through the use of the function of the deceleration setting unit 21c, the control unit 20 sets the deceleration control so that a predetermined target vehicle speed VE is achieved at the deceleration end point E. Through the use of the function of the deceleration setting unit 21c, the control unit 20 acquires the target vehicle speed VE learned in association with the deceleration end point E to be approached in the learning information 30b, and sets a deceleration distance W on the basis of the target vehicle speed VE. The deceleration distance W is a distance at which the deceleration is started when the remaining distance Z from the vehicle C to the deceleration end point E is equal to the deceleration distance W. The control unit 20 defines a constant term of the vehicle speed function V which is the primary integral function of the reference deceleration function F(Z) or the deceleration function K1·F(Z) or K2·F(Z) so that the vehicle speed at the deceleration end point E (Z=0) is equal to the target vehicle speed VE. Then, the control unit 20 acquires the remaining distance Z, at which the vehicle speed acquired from the vehicle speed function V of which the constant term is defined is equal to the current vehicle speed VI, as the deceleration distance W. In FIG. 2E, it is assumed that the vehicle C approaches the deceleration end point E at a constant vehicle speed VI in any of FIGS. 2B to 2D.

Here, since the deceleration distance W (braking distance) by which the vehicle travels at the time of reducing the current vehicle speed VI to the target vehicle speed VE decreases with an increase in the deceleration, the deceleration distance W in FIG. 2C is greater than that in FIG. 2B. Similarly, the deceleration distance W in FIG. 2D is greater than that in FIG. 2C. That is, the greater the determination distance L as the traffic volume is, the later the start of the deceleration is.

Through the use of the function of the deceleration setting unit 21c, the control unit 20 sets the deceleration so as not to perform the deceleration control when the traffic volume is equal to or greater than a threshold value. That is, when the determination distance L as the traffic volume is equal to or greater than the upper limit (for example, 25 m) of the third distance section as the threshold value, the control unit 20 sets the deceleration so as not to perform the deceleration control even if the vehicle C approaches the deceleration end point E. When the deceleration control is set not to be performed by the navigation system 10 but the brake pedal is stepped, the ECU 50 outputs a control signal for generating a deceleration based on the degree of stepping on the brake pedal to the power generator 47, the gear mechanism 49c, and the frictional brake unit 45.

In the above-mentioned example, the control unit 20 sets the deceleration at the time of performing the deceleration control on the vehicle C before the target deceleration point T depending on the traffic volume (determination distance L) at the target deceleration point T through the use of the function of the deceleration setting unit 21c. Accordingly, it is possible to set the deceleration so as not to disturb the traffic flow. Here, when the traffic volume is large and the deceleration is slowly performed at a small deceleration from a position located distant from the target deceleration point T, the traffic flow may be disturbed. When the point at which the deceleration is started is distant from the target deceleration point T, a driver of a different vehicle may misunderstand that the deceleration is not a deceleration to the target deceleration point T and thus the different vehicle may decelerate at an unnecessarily-large deceleration. On the contrary, since the control unit 20 sets the deceleration to increase as the traffic volume increases through the use of the function of the deceleration setting unit 21c, it is possible to start the deceleration from a position close to the target deceleration point T and thus to prevent the traffic flow from being disturbed.

As illustrated in FIGS. 2B to 2D, the deceleration is ended at the deceleration end point E before the target deceleration point T due to different vehicles F present between the vehicle C and the target deceleration point T. Here, as the determination distance L from the deceleration end point E to the target deceleration point T increases, it can be considered that the number of different vehicles F present between the vehicle C and the target deceleration point T increases and the traffic volume increases. Accordingly, through the use of the function of the deceleration setting unit 21c, the control unit 20 can acquire the determination distance L from the deceleration end point E to the target deceleration point T as the traffic volume. Since the deceleration end point E can be learned in association with the target deceleration point T, the traffic volume may not be acquired by a sensor, communications, or the like.

Through the function of the deceleration setting unit 21c, the control unit 20 sets the deceleration so as not to perform the deceleration control when the traffic volume is equal to or greater than a threshold value. Accordingly, when the traffic volume is large, the driver can perform the deceleration on the basis of his or her own determination instead of performing the deceleration control and it is thus possible to prevent the traffic flow from being disturbed. Through the use of the function of the deceleration setting unit 21c, the control unit 20 sets the deceleration control so that a predetermined target vehicle speed VE is achieved at the deceleration end point E. Accordingly, it is possible to reduce the vehicle speed at the deceleration end point E to the target vehicle speed VE.

2. Deceleration Control Process

Figure 3:
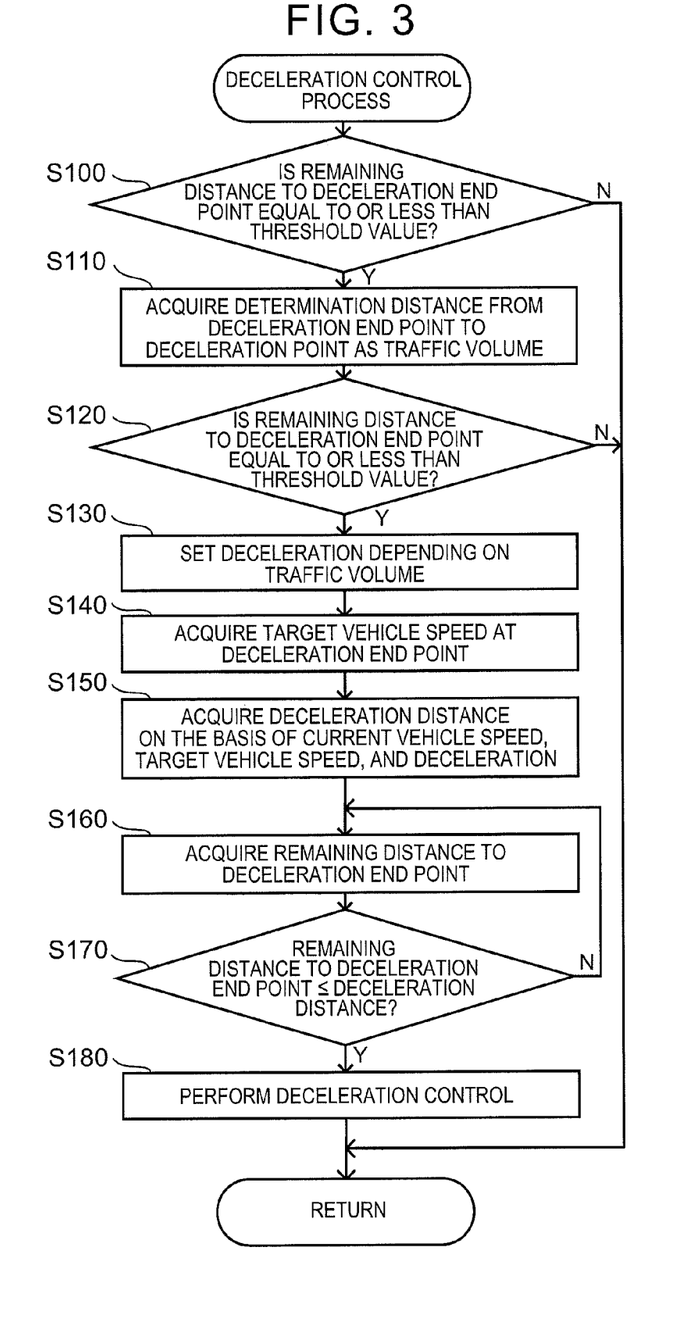
FIG. 3 is a flowchart illustrating a deceleration control process algorithm.

The deceleration control method will be described in detail below. FIG. 3 is a flowchart illustrating the deceleration control process algorithm upon which the method is based. The process algorithm may be implemented in the form of a computer program that is stored in, for example, the recording medium 30, or the RAM and/or ROM included in the control unit 20, and executed by the CPU in the control unit 20. Although the structure of the above-described navigation system 10 is referenced in the description of the method, the reference to such structure is exemplary, and the method need not be limited by the specific structure of the navigation system 10.

The deceleration control process is a process of performing a deceleration control when a vehicle travels before the valid deceleration end point E learned in the learning information 30b through the learning process. First, through the use of the function of the deceleration point acquiring unit 21b, the control unit 20 determines whether the remaining distance Z from the vehicle C to the deceleration end point E is equal to or less than a threshold value (for example, 300 m) (step S100). That is, the control unit 20 determines whether the vehicle C approaches the deceleration end point E. For example, the control unit 20 determines whether the distance from the vehicle C to the deceleration end point E is equal to or less than the threshold value when the vehicle C travels in a previously-searched planned traveling path and the deceleration end point E is present ahead in the predicted running path.

When it is determined that the remaining distance Z is not equal to or less than the threshold value (N in step S100), the control unit 20 returns the process flow and waits until the remaining distance Z is equal to or less than the threshold value.

On the other hand, when it is determined that the remaining distance Z is equal to or less than the threshold value (Y in step S100), the control unit 20 acquires the target deceleration point T and acquires the determination distance L between the deceleration end point E and the target deceleration point T as the traffic volume through the use of the function of the deceleration point acquiring unit 21b (step S110). The target deceleration point T is a deceleration point which has been learned in association with the deceleration end point E being approached in the learning information 30b, and is a deceleration point closest to the deceleration end point E out of the deceleration points present ahead of the deceleration end point E in the same link as the deceleration end point E.

Then, through the use of the function of the deceleration setting unit 21c, the control unit 20 determines whether the determination distance L as the traffic volume is equal to or greater than a threshold value (25 M) (step S120). When it is determined that the determination distance L as the traffic volume is greater than the threshold value (N in step S120), the control unit 20 returns the deceleration control process to the first step (step S100). Accordingly, when the determination distance L as the traffic volume is greater than the threshold value, the deceleration control is not performed. That is, through the use of the function of the deceleration setting unit 21c, the control unit 20 sets the deceleration so as not to perform the deceleration control when the determination distance L as the traffic volume is equal to or greater than the threshold value.

Then, through the use of the function of the deceleration setting unit 21c, the control unit 20 sets the deceleration when the vehicle C is subjected to the deceleration control before the target deceleration point T depending on the determination distance L as the traffic volume at the target deceleration point (step S130). Specifically, through the use of the function of the deceleration setting unit 21c, the control unit 20 sets the deceleration to increase as the determination distance L as the traffic volume increases. The control unit 20 sets the deceleration on the basis of the reference deceleration function F(Z) when the determination distance L falls into the first distance section (for example, 0 m≤L<5 m). The control unit 20 sets the deceleration on the basis of a deceleration function K1·F(Z), which is obtained by multiplying the reference deceleration function F(Z) by a coefficient K1 (for example, 1.5), when the determination distance L falls into the second distance section (for example, 5 m≤L<15 m). The control unit 20 sets the deceleration on the basis of a deceleration function K2·F(Z), which is obtained by multiplying the reference deceleration function F(Z) by a coefficient K2 (for example, 2), when the determination distance L falls into the third distance section (for example, 15 m≤L<25 m).

Then, through the use of the function of the deceleration setting unit 21c, the control unit 20 acquires the target vehicle speed VE at the deceleration end point E (step S140). That is, the control unit 20 acquires the target vehicle speed VE learned in association with the deceleration end point E being approached in the learning information 30b.

Through the use of the function of the deceleration setting unit 21c, the control unit 20 acquires the deceleration distance W on the basis of the current vehicle speed VI and the target vehicle speed VE (step S150). Specifically, the control unit 20 acquires the primary integral function of the reference deceleration function F(Z) or the deceleration function K1·F(Z) or K2·F(Z) set on the basis of the determination distance L as the vehicle speed function V, and sets the constant term of the vehicle speed function V so that the vehicle speed at the deceleration end point E (Z=0) is equal to the target vehicle speed VE (FIG. 2E). Then, the control unit 20 acquires the remaining distance Z at which the vehicle speed is equal to the current vehicle speed VI, as the deceleration distance W on the basis of the vehicle speed function V of which the constant term has been set. Here, as the determination distance L as the traffic volume increases, the larger deceleration distance W is acquired. In this way, the deceleration and the deceleration distance W at the time of performing the deceleration control can be set. Through the use of the function of the deceleration setting unit 21c, the control unit 20 outputs information indicating the deceleration for each remaining distance Z and the deceleration distance W to the ECU 50.

Then, the ECU 50 acquires the remaining distance Z from the vehicle C to the deceleration end point E (step S160). The ECU 50 determines whether the remaining distance Z from the vehicle C to the deceleration end point E is equal to or less than the deceleration distance W (step S170). When it is determined that the remaining distance Z is not equal to or less than the deceleration distance W (N in step S170), the ECU 50 returns the process flow to step S160. That is, the ECU 50 continues to perform the process (step S160) of acquiring the remaining distance Z until the remaining distance Z is equal to or less than the deceleration distance W.

On the other hand, when it is determined that the remaining distance Z is equal to or less than the deceleration distance W (Y in step S170), the ECU 50 performs the deceleration control (step S180). The ECU 50 acquires the deceleration for each remaining distance Z on the basis of the information output from the navigation system 10 and outputs the acquired deceleration to the power generator 47, the gear mechanism 49c, and the frictional brake unit 45. When the power corresponding to the deceleration set by the navigation system 10 is equal to or less than the regenerative upper-limit power, the ECU 50 performs the deceleration control using only the regenerative brake. On the other hand, when the power corresponding to the deceleration set by the navigation system 10 is greater than the regenerative upper-limit power, the ECU 50 performs the deceleration control using the frictional brake or the like in addition to the regenerative brake.

When the determination distance L as the traffic volume falls into the first distance section, the power corresponding to the deceleration can be set to be equal to or less than the regenerative upper-limit power by setting the deceleration on the basis of the reference deceleration function F(Z), and the kinetic energy of the vehicle can be recovered to the battery 49a as much as possible. On the other hand, when the determination distance L as the traffic volume falls into the second distance section and the third distance section, it is possible to reduce the vehicle speed at a large deceleration and to reduce the deceleration distance W by setting the deceleration on the basis of the deceleration functions K1·F(Z) and K2·F(Z). Accordingly, when the traffic volume is large, it is possible to prevent the deceleration control from being stared from a position excessively distant from the target deceleration point T and to prevent the traffic flow from being disturbed.

3. Other Examples

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

In the above-mentioned example, the ECU 50 performs the deceleration control on the basis of the deceleration set by the navigation system 10, but the ECU 50 may set the deceleration and may perform the deceleration control. The learning in the learning information 30b is not essential, but, for example, the control unit 20 may acquire a point (such as a crossing) at which a stop is required by the law as the deceleration end point E from the map information 30a and may set the deceleration for making the vehicle speed at the deceleration end point E be 0 depending on the traffic volume. In this case, the control unit 20 can acquire the traffic volume from a source other than the learning information 30b. For example, the control unit 20 may acquire the traffic volume from traffic information (for example, traffic jam information). The learning information 30b may not be learned for each vehicle C or common learning information 30b may be learned in a server with which multiple vehicles can communicate. Since the traffic volume may vary depending on days or time zones, the deceleration end point E may be learned for each day or for each time zone at which the deceleration of the vehicle C is ended in the learning information 30b.

In the above-mentioned example, the deceleration functions K1·F(Z) and K2·F(Z) are constants k1 and k2 times the reference deceleration function F(Z), respectively, but a vertex or an inflection point as well as the slope of the function defining the deceleration may vary depending on the traffic volume. The optimal deceleration has only to be set for each traffic volume so that the traffic flow is not disturbed and the order of the deceleration function or the like may vary depending on the traffic volume. In the above-mentioned example, the deceleration varies depending on the remaining distance Z, but the control unit 20 may set the deceleration to be constant regardless of the remaining distance Z. That is, the ECU 50 may perform a deceleration control of a constant deceleration at decelerations different depending on the traffic volume. In the above-mentioned example, the deceleration control for improving the regeneration efficiency is performed, but the control unit 20 may set a deceleration in which a driver's ride quality or the like is emphasized depending on the traffic volume. In this case, the control unit 20 may set the deceleration to be closer to an ideal deceleration for ride quality or the like as the traffic volume decreases and may set the deceleration to be farther from the ideal deceleration for ride quality or the like as the traffic volume increases.

As described above, the deceleration setting system includes: a deceleration point acquiring unit that acquires a deceleration point on a map; and a deceleration setting unit that sets a deceleration at the time of performing a deceleration control of a vehicle before the deceleration point depending on a traffic volume at the deceleration point. The deceleration point on the map is a point at which the vehicle decelerates and which can be derived from the map information and may be a point at which a feature as a factor for decelerating the vehicle is present or a point having a road shape that makes the vehicle decelerate. The deceleration setting unit may set the deceleration depending on a traffic volume at the deceleration point. The traffic volume may be a previous traffic volume or a current traffic volume. For example, the deceleration setting unit may acquire the traffic volume on the basis of a vehicle passing history at the deceleration point or may acquire the traffic volume on the basis of the measurement result of a sensor (such as a vehicle sensor or an inter-vehicle sensor) that is mounted on the vehicle, a different vehicle, or a road. The deceleration setting unit may acquire information indicating the traffic volume by communications with an external server or the like. The deceleration setting unit may not directly acquire the value indicating the traffic volume but may acquire, for example, an index value, which increases as the traffic volume increases, as the traffic volume.

The deceleration setting unit has only to set the deceleration depending on the traffic volume at the deceleration point, may set the deceleration depending on the magnitude of the traffic volume, or may set the deceleration depending on the variation in traffic volume. For example, the optimal deceleration for each traffic volume may be measured by experiments and the deceleration may be set depending on the traffic volume with reference to a table in which the optimal deceleration for each traffic volume is defined. The deceleration means acceleration for reducing a speed of a vehicle traveling forward and has a positive value when the vehicle speed is reduced. The deceleration setting unit may not set the deceleration on the basis of only the traffic volume, but may set the deceleration on the basis of a current vehicle speed, a target vehicle speed, a frictional coefficient of a road, or the like. The reduction mechanism of a vehicle realizing the deceleration depending on the traffic volume may be any reduction mechanism, and may be a regenerative brake, an engine brake, a frictional brake, or a combination thereof. For example, in a configuration in which the frictional brake and the regenerative brake can be used together, the deceleration setting unit may set the deceleration so as not to use the frictional brake in principle and may set the deceleration so as to use the friction brake and the regenerative brake together when the traffic volume can lead to disturbing the traffic flow.

The deceleration setting unit may acquire a distance from a deceleration end point, at which the deceleration of a vehicle is ended before the deceleration point in the past, to the deceleration point as the traffic volume. It is ideal that the deceleration of the vehicle is ended at the deceleration point registered as a point at which the vehicle decelerates on the map, but the deceleration is actually ended at a deceleration end point before the deceleration point due to different vehicles present between the vehicle and the deceleration point. Here, as the distance from the deceleration end point to the deceleration point increases, the number of different vehicles present between the vehicle and the deceleration point increases and the traffic volume increases. Accordingly, the deceleration setting unit can acquire the distance from the deceleration end point to the deceleration point as the traffic volume. Since the deceleration end point can be learned, the traffic volume may not be acquired by a sensor, communications, or the like. The point at which the deceleration is ended may be a point at which the vehicle speed is equal to 0 subsequently to a decrease in vehicle speed or a point at which the vehicle speed increases again subsequently to the decrease in vehicle speed.

The deceleration setting unit may set the deceleration to increase as the traffic volume increases. Here, when the traffic volume is large and the deceleration is slowly performed at a small deceleration from a position located distant from the deceleration point, the traffic flow may be disturbed. When the point at which the deceleration is started is distant from the deceleration point, a driver of a different vehicle may misunderstand that the deceleration is not a deceleration to the deceleration point and thus the different vehicle may decelerate at an unnecessarily-large deceleration. When the point at which the deceleration is started is distance from the deceleration point, a drive of a different vehicle may misunderstand that a traffic jam occurs. On the contrary, by setting the deceleration to increase as the traffic volume increases, it is possible to start the deceleration from a position close to the deceleration point and thus to prevent the traffic flow from being disturbed. The deceleration setting unit may set the deceleration with reference to a table in which the deceleration is defined for each section of traffic volume or may set the deceleration using a monotonous increasing function of traffic volume.

The deceleration setting unit may set the deceleration so as not to perform the deceleration control when the traffic volume is equal to or greater than a threshold value. When the traffic volume is equal to or greater than a threshold value, a driver can perform the deceleration on the basis of his or her own determination instead of performing the deceleration control and it is thus possible to prevent the traffic flow from being disturbed.

The deceleration setting unit may set the deceleration so that a predetermined target vehicle speed is achieved at the deceleration end point. Accordingly, it is possible to reduce the vehicle speed at the deceleration end point to the target vehicle speed. When the deceleration is set to increase as the traffic volume increases and the deceleration is set to reach the target vehicle speed at the deceleration end point, the deceleration is started at a point that is closer to the deceleration end point with an increase in the traffic volume.

The technique of setting a deceleration depending on a traffic volume may be applicable to a program or a method. The above-mentioned system, program, and method may be embodied by a single device, may be embodied by multiple devices, or may be embodied using components shared by the constituent units of a vehicle and include various aspects. For example, the navigation system, method, or program employing the above-mentioned system can be provided. The configuration can be properly modified as in a configuration in which a part is embodied by software and a part is embodied by hardware. The inventive principles described herein may be embodied as a recording medium of a program for controlling the system. The software recording medium may be embodied as a magnetic recording medium or a magneto-optical recording medium, and may be embodied as any recording medium to be developed in the future.

What is claimed is:

1. A deceleration setting system for a vehicle, the system comprising:
   a memory that stores:
      a computer-executable deceleration control program; and
      map information describing a map;
   a processor that, when the deceleration control program is executed:
      accesses learning information, the learning information including target deceleration points associated with deceleration end points, each target deceleration point being a point on a road where deceleration of the vehicle must be completed, and each deceleration end point being a point representative of one or more locations at which deceleration of the vehicle or another vehicle was actually completed in the past as the vehicle or the other vehicle approached the associated deceleration end point;
      acquires from the learning information a target deceleration point in the direction of travel of the vehicle and the deceleration end point associated with the acquired target deceleration point;

based on the map information, determines a distance between the acquired target deceleration point and the acquired deceleration end point;

predicts that the determined distance is a distance over which traffic is present prior to the target deceleration point in the direction of travel of the vehicle; and communicates with a vehicle ECU to perform a deceleration control of the vehicle so that (i) the longer the determined distance, the greater the deceleration rate applied during the deceleration control, and (ii) the deceleration is complete by the time the vehicle reaches the acquired deceleration end point.

2. The deceleration setting system according to claim 1, wherein, when the deceleration control program is executed, the processor cancels the deceleration control when the predicted distance over which traffic is present is equal to or greater than a predetermined threshold distance.

3. The deceleration setting system according to claim 1, wherein, when the deceleration control program is executed, the processor sets the deceleration control so that the deceleration is complete when a predetermined target speed of the vehicle is achieved at the acquired deceleration end point.

4. The deceleration setting system according to claim 1, wherein, when the deceleration control program is executed, the processor:

determines whether the predicted distance over which traffic is present is within a first predetermined distance range or a second predetermined distance range, each distance falling within the first predetermined distance range being shorter than each distance falling within the second predetermined distance range;

when the predicted distance over which traffic is present is within the first predetermined distance range, performs the deceleration control of the vehicle so that a first predetermined deceleration rate is applied during the deceleration control; and when the predicted distance over which traffic is present is within the second predetermined distance range, performs the deceleration control of the vehicle so that a second predetermined deceleration rate is applied during the deceleration control, the second predetermined deceleration being greater than the first predetermined deceleration rate.

5. The deceleration setting system according to claim 1, wherein:

the learning information includes a plurality of deceleration end points associated with the acquired target deceleration point; and when the deceleration control program is executed, the processor selects the one of the plurality of deceleration end points associated with the acquired target deceleration point that is closest to the acquired target deceleration point as the acquired deceleration end point.

6. The deceleration setting system according to claim 1, wherein the learning information is stored in the memory.

7. The deceleration setting system according to claim 1, wherein the learning information is stored on a remote server.

8. The deceleration setting system according to claim 1, wherein:

the learning information includes a plurality of deceleration end points associated with the acquired target deceleration point, each one of the plurality of deceleration end points associated with the acquired target deceleration point being associated with at least one of a particular day of the week and a particular time of the day; and when the deceleration control program is executed, the processor selects one of the plurality of deceleration end points associated with the acquired target deceleration point as the acquired deceleration end point based on the associated at least one of a particular day of the week and a particular time of the day.

9. A deceleration setting method for a vehicle, the system comprising:

accessing, with a processor:

map information describing a map; and learning information, the learning information including target deceleration points associated with deceleration end points, each target deceleration point being a point on a road where deceleration of the vehicle must be completed, and each deceleration end point being a point representative of one or more locations at which deceleration of the vehicle or another vehicle was actually completed in the past as the vehicle or the other vehicle approached the associated deceleration end point;

acquiring from the learning information, with the processor, a target deceleration point in the direction of travel of the vehicle and the deceleration end point associated with the acquired target deceleration point;

based on the map information, determining, with the processor, a distance between the acquired target deceleration point and the acquired deceleration end point;

predicting, with the processor, that the determined distance is a distance over which traffic is present prior to the target deceleration point in the direction of travel of the vehicle; and causing the processor to communicate with a vehicle ECU to perform a deceleration control of the vehicle so that (i) the longer the determined distance, the greater the deceleration rate applied during the deceleration control, and (ii) the deceleration is complete by the time the vehicle reaches the acquired deceleration end point.

10. The deceleration setting method according to claim 9, further comprising canceling, with the processor, the deceleration control when the predicted distance over which traffic is present is equal to or greater than a predetermined threshold distance.

11. The deceleration setting method according to claim 9, further comprising setting, with the processor, the deceleration control so that the deceleration is complete when a predetermined target speed of the vehicle is achieved at the acquired deceleration end point.

12. The deceleration setting method according to claim 9, further comprising:

determining, with the processor, whether the predicted distance over which traffic is present is within a first predetermined distance range or a second predetermined distance range, each distance falling within the first predetermined distance range being shorter than each distance falling within the second predetermined distance range;

when the predicted distance over which traffic is present is within the first predetermined distance range, performing, with the processor, the deceleration control of the vehicle so that a first predetermined deceleration rate is applied during the deceleration control; and when the predicted distance over which traffic is present is within the second predetermined distance range, performing, with the processor, the deceleration control of the vehicle so that a second predetermined deceleration rate is applied during the deceleration control, the second predetermined deceleration being greater than the first predetermined deceleration rate.

13. The deceleration setting method according to claim 9, wherein:
the learning information includes a plurality of deceleration end points associated with the acquired target deceleration point; and
the method further comprises selecting, with the processor, the one of the plurality of deceleration end points associated with the acquired target deceleration point that is closest to the acquired target deceleration point as the acquired deceleration end point.

14. The deceleration setting method according to claim 9, wherein:
the learning information includes a plurality of deceleration end points associated with the acquired target deceleration point, each one of the plurality of deceleration end points associated with the acquired target deceleration point being associated with at least one of a particular day of the week and a particular time of the day; and
the method further comprises selecting, with the processor, one of the plurality of deceleration end points associated with the acquired target deceleration point as the acquired deceleration end point based on the associated at least one of a particular day of the week and a particular time of the day.

15. A computer-readable storage medium storing a computer-executable deceleration setting program for a vehicle, the program comprising:
instructions causing a processor to access:
map information describing a map; and
learning information, the learning information including target deceleration points associated with deceleration end points, each target deceleration point being a point on a road where deceleration of the vehicle must be completed, and each deceleration end point being a point representative of one or more locations at which deceleration of the vehicle or another vehicle was actually completed in the past as the vehicle or the other vehicle approached the associated deceleration end point;
instructions causing the processor to acquire from the learning information a target deceleration point in the direction of travel of the vehicle and the deceleration end point associated with the acquired target deceleration point;
instructions causing the processor to, based on the map information, determine a distance between the acquired target deceleration point and the acquired deceleration end point;
instructions causing the processor to predict that the determined distance is a distance over which traffic is present prior to the target deceleration point in the direction of travel of the vehicle; and
instructions causing the processor to communicate with a vehicle ECU to perform a deceleration control of the vehicle so that (i) the longer the determined distance, the greater the deceleration rate applied during the deceleration control, and (ii) the deceleration is complete by the time the vehicle reaches the acquired deceleration end point.

16. The computer-readable storage medium according to claim 15, the program further comprising instructions causing the processor to cancel the deceleration control when the predicted distance over which traffic is present is equal to or greater than a predetermined threshold distance.

17. The computer-readable storage medium according to claim 15, the program further comprising instructions causing the processor to set the deceleration control so that the deceleration is complete when a predetermined target speed of the vehicle is achieved at the acquired deceleration end point.

18. The computer-readable storage medium according to claim 15, the program further comprising:
instructions causing the processor to determine whether the predicted distance over which traffic is present is within a first predetermined distance range or a second predetermined distance range, each distance falling within the first predetermined distance range being shorter than each distance falling within the second predetermined distance range;
instructions causing the processor to, when the predicted distance over which traffic is present is within the first predetermined distance range, perform the deceleration control of the vehicle so that a first predetermined deceleration rate is applied during the deceleration control; and
instructions causing the processor to, when the predicted distance over which traffic is present is within the second predetermined distance range, perform the deceleration control of the vehicle so that a second predetermined deceleration rate is applied during the deceleration control, the second predetermined deceleration being greater than the first predetermined deceleration rate.

19. The computer-readable storage medium according to claim 15, wherein:
the learning information includes a plurality of deceleration end points associated with the acquired target deceleration point; and
the program further comprises instructions causing the processor to select the one of the plurality of deceleration end points associated with the acquired target deceleration point that is closest to the acquired target deceleration point as the acquired deceleration end point.

20. The computer-readable storage medium according to claim 15, wherein:
the learning information includes a plurality of deceleration end points associated with the acquired target deceleration point, each one of the plurality of deceleration end points associated with the acquired target deceleration point being associated with at least one of a particular day of the week and a particular time of the day; and
the program further comprises instructions causing the processor to select one of the plurality of deceleration end points associated with the acquired target deceleration point as the acquired deceleration end point based on the associated at least one of a particular day of the week and a particular time of the day.

* * * * *